Dec. 28, 1937.    H. M. CAMPBELL    2,103,513
MEANS FOR COOKING FOODS
Filed April 15, 1936

INVENTOR.
Huntly M. Campbell
BY Emmes B. Wisner
ATTORNEY.

Patented Dec. 28, 1937

2,103,513

UNITED STATES PATENT OFFICE 2,103,513

MEANS FOR COOKING FOODS

Huntly M. Campbell, Detroit, Mich.

Application April 15, 1936, Serial No. 74,420

2 Claims. (Cl. 219—20)

This invention relates to means for cooking foods and the object of the invention is to provide an arrangement for controlling a heating unit by the heat in the interior of the food being cooked, so that when the interior of the food reaches a predetermined temperature, the heating unit is automatically shut off.

Another object of the invention is to provide a heat sensitive device arranged for insertion in the food being cooked to control a heating unit, the heat sensitive device being arranged to close a secondary circuit upon reaching a predetermined temperature and the secondary circuit when closed breaking the main circuit to the heating unit.

A further object of the invention is to provide an arrangement whereby the secondary circuit in which the heat sensitive device is connected is of low amperage and low voltage to reduce arcing at the time the contacts are closed and the secondary circuit including a relay controlling a primary circuit to shut off the heating unit.

Another object of the invention is to provide a method of cooking in which the temperature of the interior of the food being cooked upon reaching a predetermined point is utilized to shut off the heating unit for cooking the food.

A further object of the invention is to provide a heat sensitive device inserted in the food being cooked and arranged upon reaching a predetermined temperature to shut off the heating unit by which the food is cooked.

These objects and the several novel features of the invention are hereinafter more fully described and claimed and one form of construction by which these objects are attained is shown in the accompanying drawing in which—

In previous methods of cooking it has been the practice to control the oven temperature and the time period in cooking. Nearly all of the present oven controls are either arranged to control the temperature of the oven by varying the heat produced by the burner or to use a temperature control in combination with a time clock for shutting off the burner after a predetermined temperature has been maintained for a predetermined interval in an oven.

This invention seeks to control the heating unit in accordance with the temperature in the interior of a roast or other article being cooked and when the interior of the roast or article being cooked has reached a predetermined temperature the heating unit is automatically shut off. This provides a control independent of oven temperature and independent of the time interval.

For instance, should the oven temperature be 250° Fahrenheit, it would take considerable time before the interior of the food being cooked attained 200° Fahrenheit so that the thermometer would shut the burner off. On the other hand, with a 350° oven, the period to bring the interior of the roast to 200° Fahrenheit would be much shorter. While I have suggested the method as used in cooking a roast, the method is essentially the same in cooking any kind of food. For instance, with escalloped potatoes, the point of the heat sensitive device could be positioned in the center of the material and when the center of the material had reached the predetermined temperature, the burner would automatically shut off.

Figure 2:
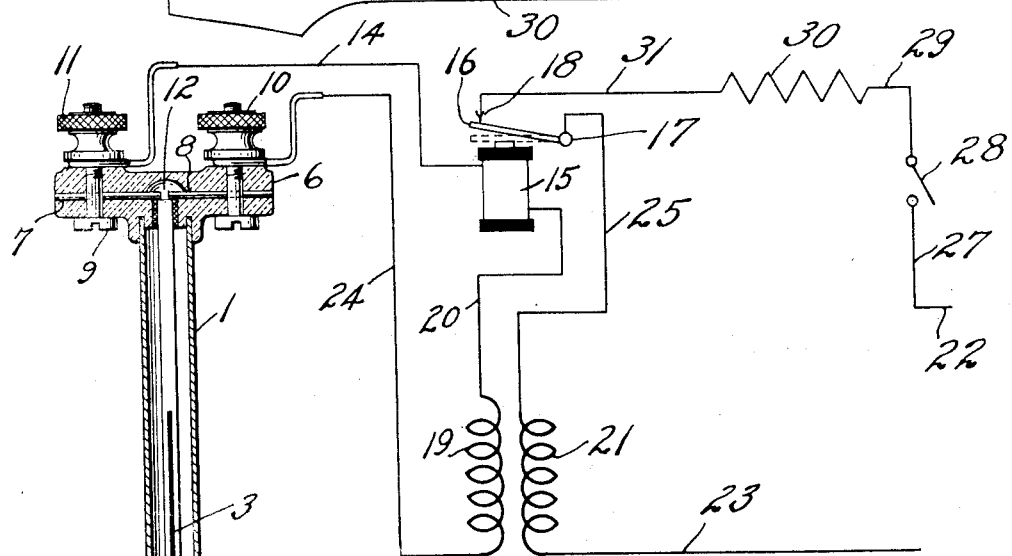
Fig. 2 is an enlarged section through the heat sensitive device and including the circuits controlled by the said device diagrammatically.

One form of the heat sensitive device comprises a casing 1 having a sharp point 2 and this casing contains a thermometer 3 having a mercury bulb 4 which may be embedded in the material 5 filling the point 2 of the casing 1. The tubular casing 1 at the upper end is provided with a porcelain head 6 and the upper end of the thermometer 3 is supported in a packing 7 in the head 6. A pair of contact members 8 and 9 are also embedded in the porcelain head 6 and are connected to binding posts 10 and 11 as shown. These contact members 8 and 9 are spaced apart to provide a space 12 so that after the mercury in the thermometer moves upwardly it will fill this space 12 and provide electrical contact between the contact members 8 and 9 to close a secondary circuit. A chamber 13 may be provided above the space 12 to allow for further expansion of the mercury in the thermometer without damage to the thermometer. The binding post 11 is connected by a wire 14 to the coil 15 of a relay and an armature 16 is provided for this relay and is pivotally mounted at the point 17 and is arranged to contact the contact point 18 when in the operating position. A transformer is provided having a secondary coil 19 connected by a wire 20 to the coil 15 of the relay and the primary coil 21 of the transformer is connected to one side of a 110 volt circuit by the wire 23. The secondary coil 19 of the transformer is connected by a wire 24 to the binding post 10, as shown in Fig. 2.

In the primary circuit, a wire 25 is connected to the primary coil 21 and at the opposite end is connected to the armature 16 at the point 17. A wire 27 is connected to the opposite wire 22 of the 110 volt primary circuit and leads to a manually operable switch 28 which is the normal heating unit switch provided on an electric range and a wire 29 leads from the switch 28 to the heating element 30 of the oven heating unit and a wire 31 leads from the heating element 30 to the contact point 18, as shown in Fig. 2.

Figure 1:
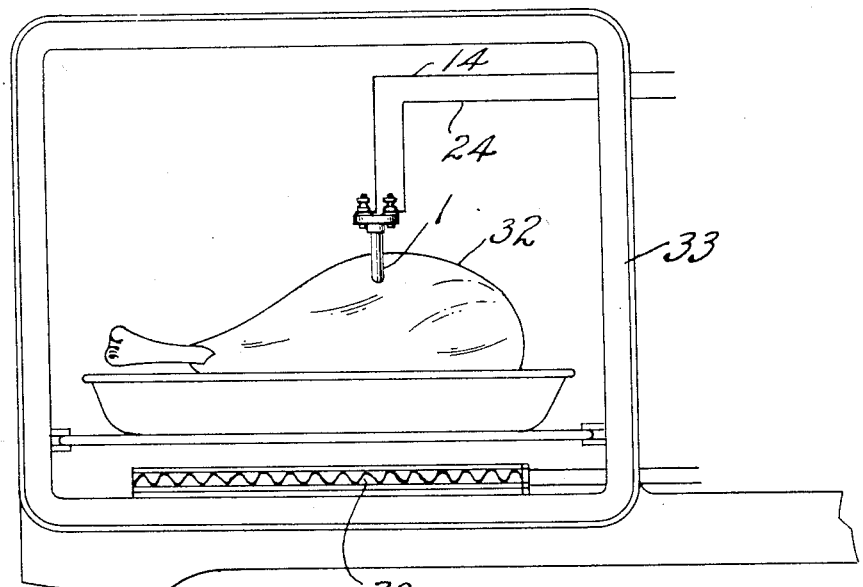
Fig. 1 is a view showing the interior of an oven including a heat sensitive device and a heating unit controlled thereby.

In operation, the pointed casing 1 as shown in Fig. 1 is inserted in a roast 32 so that the point of the casing 1 is near the center of the roast. The thermometer binding posts 10 and 11 are connected in the secondary circuit by the wires 14 and 24 as will be understood from Figs. 1 and 2. At this time, the armature 16 is in position to contact the contact point 18 and the switch 28 to the burner 30 is manually closed to energize the circuit to the heating element 30. As the oven 33 is heated, the roast 32 begins to cook and as the temperature in the center of the roast begins to rise, the mercury begins to rise in the thermometer 3. As this mercury continues to rise, it finally rises to a point between the contact members 8 and 9 completing an electrical circuit between these contact members. At this time, the secondary circuit is closed by the mercury between the contact members 8 and 9 and the current induced in the secondary 19 flows through the wire 24, binding post 10, contact 8 and thermometer mercury and thence through the contact 9 to the binding post 11. From the binding post 11 the current flows through the wire 14 and through the coil 15 of the relay, thence back through the wire 20 to the secondary winding 19 of the transformer. The flow of current through the coil 15 of the relay energizes the core of this coil and draws the armature 16 down against the core as shown in dotted lines in Fig. 2, thus breaking the primary circuit at the point 18 and shutting off the current to the electric heating element 30, thus shutting off the oven. The thermometer is so arranged that a predetermined temperature must be reached in the interior of the roast before the mercury rises to position to close the secondary circuit and, if desired, a series of contact points 8 and 9 may be provided for the thermometer to different ones of which the wires 14 and 24 may be connected to close the secondary circuit at different temperatures. While I have shown the device as used with a roast, it may be used for cooking any food into which the point 2 of the casing 1 may be inserted or positioned.

Also, while I have described this device as utilized in conjunction with an oven, it may be used for cooking food over an open burner, in which case, the thermometer or other heat sensitive device is inserted in the food being cooked to shut off the heating unit on which the food is cooked at the time the food reaches the predetermined temperature.

For simplicity of disclosure, the device is illustrated as utilized for shutting off an electric heating unit or burner. However, it is also possible to shut off a gas burner by providing electrical means in the primary circuit for shutting off a gas valve to the gas burner.

The relay armature may be manually re-set to the position shown in full lines in Fig. 2 to prepare for successive operation of the device but it is also possible to automatically re-set this relay armature, though the automatic means for such re-setting is not here shown.

One of the particular advantages of this device is that the heating unit is controlled accurately in conjunction with the temperature in the interior of the food being cooked and by shutting off the heating unit at a predetermined temperature of the food, very uniform results may be attained. Another advantage of this arrangement is in the automatic operation, in that it is only necessary to insert the point of the casing 1 into the food being cooked and close the switch 28 to the heating unit and manually set the relay armature, at which time, no further attention need be given to the cooking operation.

From the foregoing description it becomes evident that the device is very simple and efficient in operation, may be readily installed in an oven and provides fully automatic operation after the cooking is started and provides a device which accomplishes the objects described.

Having thus fully described my invention, its utility and mode of operation, what I claim and desire to secure by Letters Patent of the United States is—

1. Means for cooking foods comprising an oven, an electric heating element for heating the interior of the oven, a primary circuit connected to and supplying current to the electric heating element, a heat sensitive device adapted for insertion in the food being cooked, a secondary circuit, a transformer between the two circuits, the heat sensitive device being detachably connected into the secondary circuit for manual movement within the oven, said connection allowing movement of the food in relation to the electric heating element about the interior of the oven with the heat sensitive device therein, the arrangement being such that the heat sensitive device will close the secondary circuit when the interior of the food being cooked reaches a predetermined temperature and means operated by closing of the secondary circuit to open the primary circuit.

2. Means for cooking foods comprising an oven, a heating unit for heating the interior of the oven, a primary circuit for operating the heating unit, a heat sensitive device adapted for insertion in the food being cooked, a secondary circuit, a transformer between the two circuits, the heat sensitive device being detachably connected in the secondary circuit for manual movement within the oven, said connection allowing movement of the food in relation to the electric heating element about the interior of the oven with the heat sensitive device therein, the arrangement being such that the heat sensitive device will close the secondary circuit when the interior of the food being cooked reaches a predetermined temperature and means operated by closing of the secondary circuit to open the primary circuit.

HUNTLY M. CAMPBELL.